March 29, 1955     R. E. DU BOIS     2,704,888
ROTARY SHEAR
Filed Feb. 27, 1952
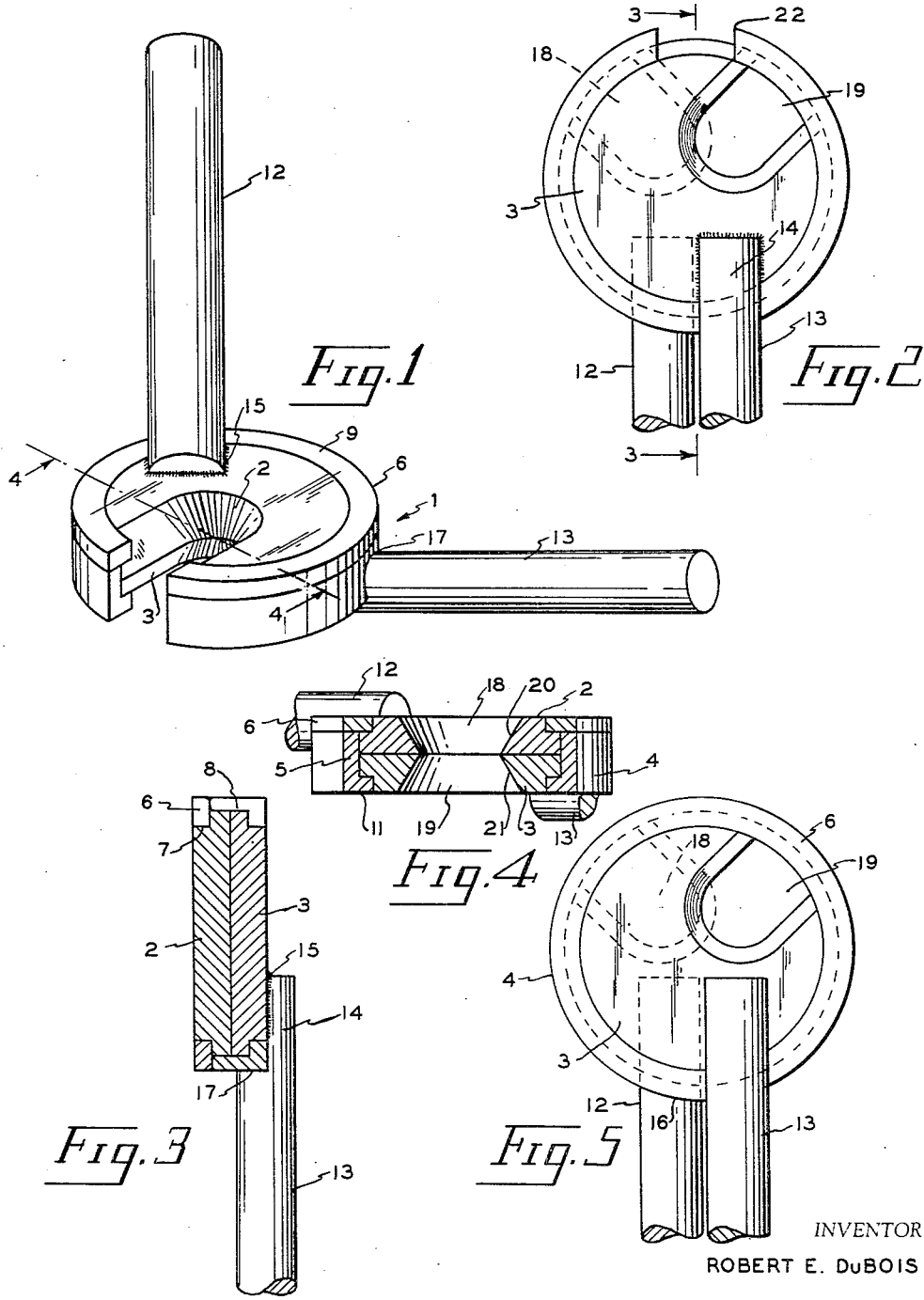
INVENTOR
ROBERT E. DuBOIS
BY *Robert B. Harmon*
ATTORNEY

United States Patent Office 2,704,888
Patented Mar. 29, 1955

2,704,888

ROTARY SHEAR

Robert E. Du Bois, Hammond, Ind.

Application February 27, 1952, Serial No. 273,689

1 Claim. (Cl. 30—244)

This invention relates to improvements in rotary shears for severing metal rods, wire, cables, and the like.

The primary object of the invention is to provide an improved rotary shear construction in which the leverage required to shear a given piece of work when compared to the prior patented art is materially reduced on such shears.

An important object of the invention is to provide an improved rotary shear in which a novel means is provided to prevent the rotary cutting blades from separating when shearing a piece of work.

A specific object of the invention is to provide an improved rotary shear in which the cutting blades are mounted for relative rotation within a surrounding casing thereby requiring no central, connecting, pivot pin.

Another object of the invention is to provide a rotary shear in which the circular cutting blades are each recessed substantially to their centers from the peripheries thereof to thereby make up adjacent cutting surfaces approximately equal in length to the radii of the cutting blades.

A further object of the invention is to provide a rotary shear with two adjacent cutting blades carried within a casing and means to rotate the blades relative to each other within the casing.

With the foregoing and other objects in view, the invention resides in the following specification and appended claims, certain embodiments and details of construction of which are shown in the accompanying drawing, in which:

Figure 1 is a view in perspective of the invention;

Figure 2 is a plan view of the invention;

Figure 3 is a view in side elevation taken along the lines 3—3 of Figure 2;

Figure 4 is a sectional view taken along the lines 4—4 of Figure 1; and

Figure 5 is a plan view of a modified form of the invention.

Referring more particularly to Figure 1, a rotary shear shown generally at 1 comprises circular members or blades 2 and 3 carried within a casing 4 for rotary movement therein. The casing 4 is formed from a circular section 5 which is L-shaped in cross section and a confining ring 6 which is welded or otherwise secured to the section 5 after the blades 2 and 3 have been placed therein. Blade 2 is offset at 7 so that its periphery extends under the ring 6 into light frictional engagement with the inner surface 8 of the section 5. The blade 2, with the exception of the offset portion at 7, is shown to be flush with the upper surface 9 of the ring 6.

The lower blade 3, as viewed in Figure 1, is offset at 10 so that its periphery extends under lip 11 of L-shaped section 5 into light frictional engagement with the surface 8. Thus it may be seen that the blades 2 and 3 are confined in face-abutting relationship within the casing 4 in such manner as to permit relative rotation. Manual means comprising handles 12 and 13 are provided for rotating blades 2 and 3 respectively, although, obviously, in heavy duty models a power drive means for the blades would be more suitable. Each handle is shown having an extended portion 14 welded at 15 to a blade. Arcuate end surface sections 16 and 17 on handles 12 and 13 abut the periphery of casing 4 in light frictional engagement therewith.

Blades 2 and 3 are provided with substantialy U-shaped cutaway recesses 18 and 19 respectively, which are identical in nature. Referring to Figure 4, it is seen that the blades 2 and 3 are tapered adjacent the recesses 18 and 19 to provide adjacent, coacting cutting edges 20 and 21.

As shown in Figures 1 and 2, the casing is cut away to provide an opening at 22 so that the shear may receive work to be cut in the recesses 18 and 19. This construction is primarily a convenience to the operator when it is desired to sever a rather long piece of work at a substantial distance from one end.

The modified form shown in Figure 5 does not provide a cutaway portion in the casing for receiving work. This modified form is designed for use in the shearing of the end portions of work and provides a somewhat stronger construction than the preferred form of the invention shown in Figures 1 to 4, due to the fact that the casing is continuous.

In operation the handles 12 and 13, or other operating means, are moved so that the recesses 18 and 19 of blades 2 and 3, together with opening 22 of the casing, fall into alignment as seen in Figure 1. The handles, due to their position of attachment to the blades, are at this point about 90 degrees offset from one another. Work such as a cable is then placed in the bottom of the recesses for a shearing operation. The work is positioned at the bottom of the recesses 18 and 19 because the closer to the centers of blades 2 and 3 it is possible to position the work, the greater the resulting leverage will be from an applied force to handles 12 and 13. When such a force is applied to the handles so as to move them to the position shown in Figure 2, the recesses 18 and 19 will be moved completely out of alignment and any work previously positioned therein will be sheared by the coating cutting edges 20 and 21.

It is obvious that only one of the blades need be rotated to exert a shearing action. Thus, one handle may be held stationary and the other handle only be moved. In other words, it is merely necessary that the blades 2 and 3 be relatively rotatable, and one blade could, in fact, be fixed or stationary within casing 4 or could, in fact, be a part of said casing. Although not shown in the drawing, the blade 3 and the section 5 of the casing 4 could be co-extensive or integral. The blade 2 would then be placed in face abutting relationship to blade 3 and the ring 6 secured to the section 5, which would then be an extension of blade 3 to complete the assembly.

During a shearing action, the ring 6 and lip 11 of casing section 5 prevent the blades 2 and 3 from moving transversely to their planes of rotation, which is the normal tendency in shears.

Thus it is seen that the invention provides an improved rotary shear of such construction as to derive the maximum leverage for a given applied force during a shearing operation, while maintaining the cutting blades in their respective planes of rotation.

I claim:

A rotary shear comprising a pair of circular cutting blades, each blade being cut away from the periphery substantially to the center thereof to provide a U-shaped work-receiving recess with a cutting edge on each blade adjoining the said recess at all points thereof, and each blade being further provided with a continuous reduced offset portion adjacent to its periphery and on the opposite side from its coacting surface with the other blade, a circular casing engaging the peripheral offset portions of the blades to confine said blades in face abutting relationship, said casing being cut away over a relatively small portion of its circumference to provide an opening, the said opening and the blade recesses all being adapted to co-alignment for receiving work, and means to rotate the blades relative to each other within said casing.

References Cited in the file of this patent

UNITED STATES PATENTS

| 54,520 | Flinn | May 8, 1866 |
| 146,846 | Stevens | Jan. 27, 1874 |
| 464,976 | Lindfors | Dec. 15, 1891 |
| 690,083 | Stolpe | Dec. 31, 1901 |
| 740,612 | Baartmans | Oct. 6, 1903 |
| 777,126 | McLeran | Dec. 13, 1904 |
| 955,287 | Schofield | Apr. 19, 1910 |

FOREIGN PATENTS

| 372 | Great Britain | 1869 |